July 30, 1929.   O. W. POTTS   1,722,394
POT LID HOLDER
Filed Oct. 6, 1928
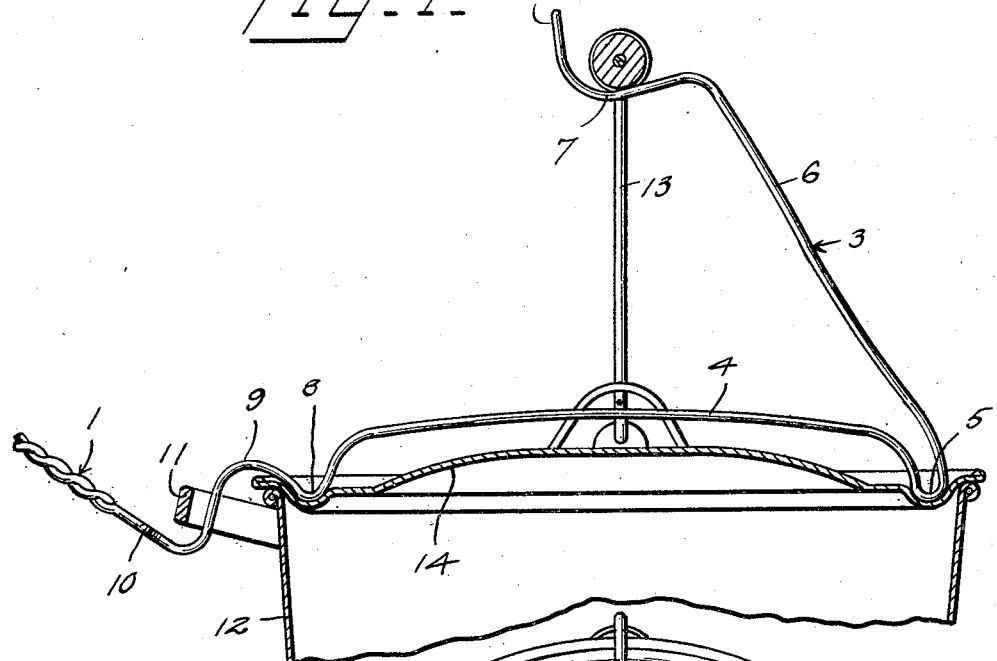
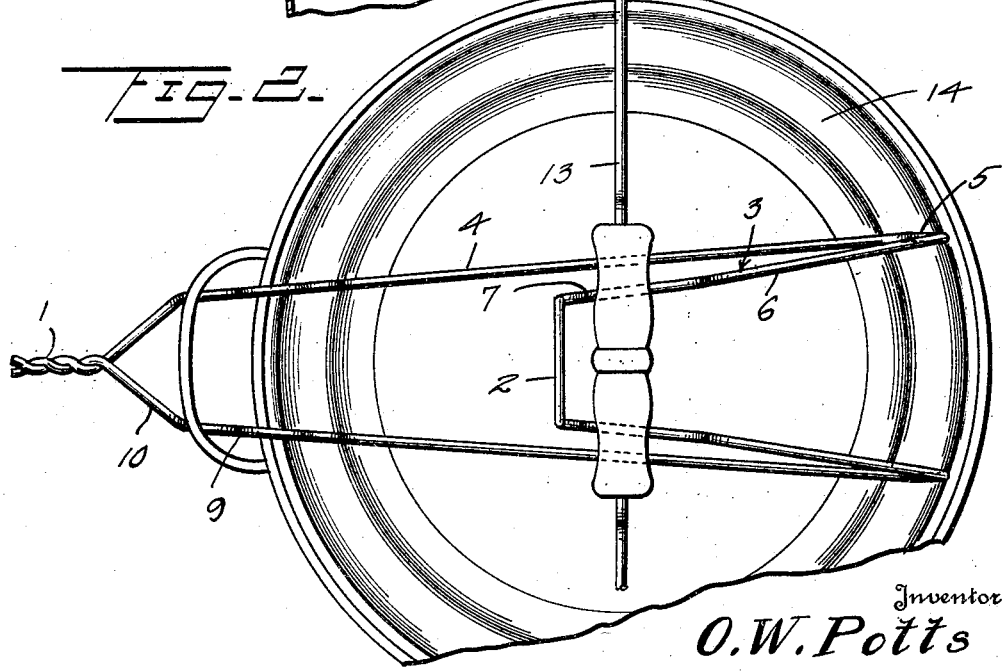
Inventor
O. W. Potts
By Watson E. Coleman
Attorney Patented July 30, 1929.

1,722,394

UNITED STATES PATENT OFFICE.

OSCERO W. POTTS, OF PEDRICKTOWN, NEW JERSEY.

POT-LID HOLDER.

Application filed October 6, 1928. Serial No. 310,734.

This invention relates to the class of kitchen and table articles and pertains particularly to a device for securing receptacle lids in position, more particularly the lids of pots having bail handles.

The primary object of the present invention is to provide a lid holding device wherein the receptacle lid is securely held in position on the receptacle and the receptacle handle will be maintained in upright position away from the receptacle and the heat thereof.

A further object of the invention is to provide a lid holder for receptacles having bail handles, which is designed to be easily and quickly placed in position and which due to its inherent resilient qualities will act to more properly maintain the lid in position in direct proportion to the pressure exerted against the under side thereof by the cooking material within the receptacle.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a vertical central sectional view through a pot and lid showing the device embodying the present invention in side elevation and applied thereto;

Figure 2 is a top plan view of the structure shown in Figure 1.

It will be seen that the lid holding device embodying the present invention is preferably constructed of a single length of wire of suitable weight and resiliency.

The device is formed by taking a split annular piece of wire and folding the same transversely so that two semi-circular pieces will be formed which are joined together by a straight connecting portion at one end while the other ends thereof are separate. These separate ends are then twisted together forming the connection 1 of the finished article while the straight connecting portion above referred to forms the connection 2 at the opposite end of the two halves of which the article is made up, these two halves each being indicated as a whole by the numeral 3. The double semi-circular body connected at the ends in the manner described is then bent over a suitable form so that each of the halves 3 of the finished holder will comprise an arcuate lid cover section 4, one end of which is connected by the down-turned loop 5 with an angularly directed upwardly extending portion 6, the upper end of the portion 6 being turned back slightly and then bent upwardly where it joins the connecting section 2 between the two portions 3, to form a pot handle receiving cradle 7.

The other end of each of the pot lid engaging portions 4 is bent downwardly slightly as at 8 and is then extended upwardly to form the arc 9 which is designed to pass over the edge of the pot lid when the device is in position, this arcuate portion being directed downwardly in such manner that its terminal portion which is twisted or otherwise joined to the terminal portion of the other member forms the hook 10 designed, when the pot upon which the holder is used has a handle such as that indicated at 11, to hook through this handle.

When the device is in position upon the pot such as that indicated at 12, it being assumed that the pot is equipped with the bail 13 and a lid 14, the two lower portions 4 of the holder device extend across the top of the lid with the down-bent or loop sections 5 and 8 bearing thereagainst adjacent the edge thereof. The upwardly extended arm portion 6 of the devices are bent down to permit the bail 13 to be swung to position where it will engage in the cradles 7 of these portions whereupon the portions may be released so that they will swing upwardly to engage the bail in the cradle thereof.

While the device has been provided with the hooked portion 10 designed to engage through the handle of the pot such as that indicated at 11, it is not essential to the proper working of the lid holder that there be a handle for the hook 10 to engage as the holder will work as efficiently if such a handle is not present.

From the foregoing description it will be readily appreciated that with a pot lid holder of the character described the pot may be readily handled while containing hot liquids or other material without danger of the lid becoming displaced and the holder may also be employed for maintaining the lid in a set position for draining the liquid contents of the pot without permitting the escape of solid matter therein.

Having thus described my invention what I claim is:—

1. A pot lid holder, consisting of a frame comprising a base portion formed to fit over a pot lid, and an integral resilient extension projecting upwardly from one end thereof at an inclination thereto and overlying the base, said extension being designed to be forced down, when the base is in position on a pot lid, against its inherent tendency to rise, for the engagement of its upper end under a bail handle, said upper end of the extension being formed to provide a bail handle receiving loop, said base portion at the end remote from the point of connection thereto of the resilient extension, being formed to provide a hook designed for engagement through a pot handle.

2. A pot lid holder comprising a base structure consisting of a pair of elongated resilient bodies connected at one end and designed to overlie and rest upon the top of the lid, and an upwardly extending member comprising a pair of resilient bodies each forming a continuation of one of said lower bodies and each having its upper end formed to provide a handle bail receiving cradle, said resilient members being connected at their upper ends.

3. A pot lid holder comprising a base structure consisting of a pair of elongated resilient bodies connected at one end and designed to overlie and rest upon the top of the lid, an upwardly extending member comprising a pair of resilient bodies each forming a continuation of one of said lower bodies and each having its upper end formed to provide a handle bail receiving cradle, said resilient members being connected at their upper ends, the connected ends of said resilient bodies being formed to provide a hook device designed to extend beyond the supporting lid for engagement through a handle of a pot.

In testimony whereof I hereunto affix my signature.

OSCERO W. POTTS.